Sept. 4, 1951 B. J. LIMPO ET AL 2,566,771
GATE FASTENER
Filed Feb. 3, 1948
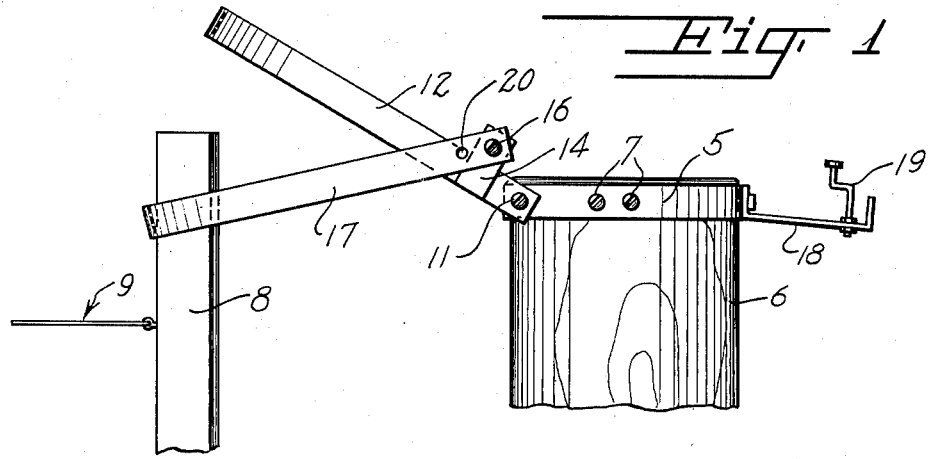
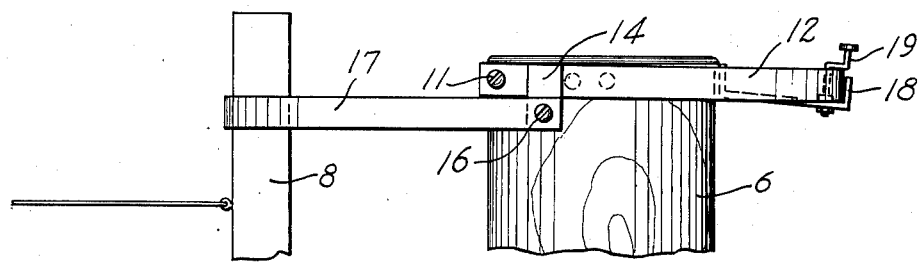
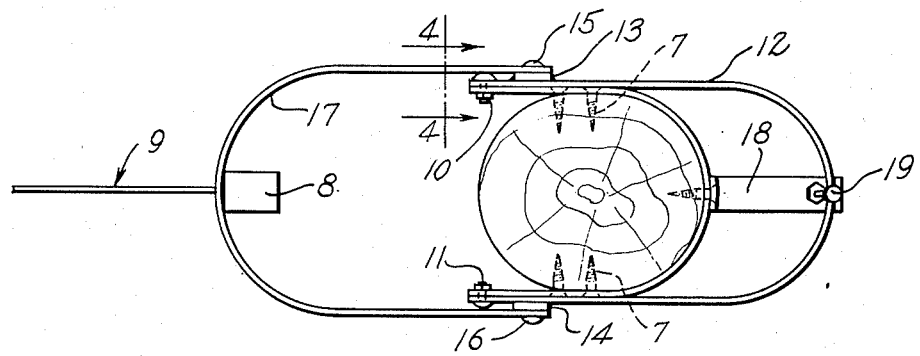
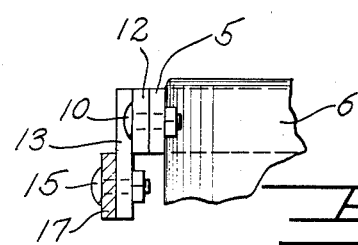
INVENTOR.
Bennett J. Limpo and
Thomas H. Limpo
BY
McMorrow, Berman & Davidson
Attorneys Patented Sept. 4, 1951

2,566,771

UNITED STATES PATENT OFFICE 2,566,771

GATE FASTENER

Bennett J. Limpo and Thomas H. Limpo, Lynwood, Calif.

Application February 3, 1948, Serial No. 5,974

1 Claim. (Cl. 292—250)

This invention relates to a fastener for nonrigid gates, particularly "wire gates" which comprise a free or movable upright adapted, when the gate is closed, to be drawn toward and held adjacent the gate post whereby the wires forming the gate are maintained in tightened condition for constituting, in effect, a continuation of the fence with which the gate is associated.

An object of the invention is to provide a gate fastener of the kind described constituting a lever and a link connected therewith for engaging the gate stick or upright and holding it securely in gate-closing position.

Another object is to provide such a fastener in which the link is substantially locked by movement into closed position.

Another object is to provide a gate-closing means simple in construction and instantaneous in use.

These and other objects are attained by the means described herein and illustrated in the accompanying drawings, in which:

Figure 1 is a side elevational view of the invention shown operatively associated with the top portions of a gate post and a gate upright or stick, the gate fastener being in the intermediate position between opening or closing, Figure 2 is a similar view showing the gate fastener in closed position, Figure 3 is a top plan view of the means illustrated in Figure 2, Figure 4 is a cross sectional view on line 4—4 of Figure 3.

With detailed reference to the drawing, the invention comprises a U-shaped strap 5 embracing the top portion of a gate post 6, and secured thereto as by screws 7. The ends of strap 5 project toward the upright or stick 8 of an associated wire gate 9, and have pivotally connected therewith, as at 10 and 11, the ends of a U-shaped lever 12 adapted to be swung forwardly toward and rearwardly away from the upright 8. Adjacent the pivoted ends of the lever the latter has secured thereto, at opposite sides, a pair of extensions 13 and 14 and these, in turn, have pivotally attached thereto, as at 15 and 16, the ends of a U-shaped link 17.

Rearward pivotal movement of lever 12 is limited by a bracket 18 projecting rearwardly of the gate post from the strap 5. The bracket has a crank-shaped latch 19 mounted thereon, adapted to be turned as in Figure 1, for permitting swinging of the lever, or as in Figure 2, for precluding the same, by overlapping the bracket-positioned lever.

When the lever 12 is swung forwardly, as in Figure 1, the link 17 is adapted to be engaged over the top of the gate upright 8. Upon rearward swinging of the lever 12 to the position of Figures 2 and 3, the upright is drawn by the link toward the gate post for closing the gate and rendering the wires thereof taut.

The extensions 13 and 14, in the rearward position of the lever 12, project downwardly thereof so that the pressure exerted on the lever by the link presses the link firmly against the bracket 18 and resists upward or forward pivoting of the lever. This pressure becomes operative as soon as the lever, in its movement toward closure, has passed the mid-point of its arc, the lever snapping down automatically into closed position. As a further measure against accidental release, the latch 19 may be utilized as already described.

The link 17 may be provided with additional pivot holes 20 for adjusting the gate-fastener to a tighter closing relationship.

What is claimed is:

A gate fastener comprising a horizontally disposed U-shaped strap adapted to be embracingly secured to a gate post adjacent its top, said strap having the free ends of its legs projecting toward and spaced from a gate, a horizontally disposed bracket positioned exteriorly of the bight of said strap and having one end secured to said bight, an upstanding crank latch positioned adjacent to and spaced from the other end of said bracket and mounted on said bracket for rotation about a vertical axis, a U-shaped lever having the free ends of its legs facing the free end of the legs of said strap and connected thereto for swinging movement about a horizontal axis into and out of embracing relation with respect to said crank latch, a portion of said crank latch being engageable with the bight of said lever when the lever bight is in embracing relation to the crank latch to hold the lever against movement toward releasing position, an upstanding bar positioned adjacent to and spaced from each of the free ends of the legs of said lever and fixedly secured thereto, and a U-shaped link having the free ends of its legs facing said upstanding bars and connected to said bars for movement about a horizontal axis into and out of embracing relation with respect to a part of said gate.

BENNETT J. LIMPO.
THOMAS H. LIMPO.

REFERENCES CITED

The following references are of record in the file of this patent:

UNITED STATES PATENTS

| Number | Name | Date |
|---|---|---|
| 37,602 | Smith | Feb. 3, 1863 |
| 1,190,587 | Roda | July 11, 1916 |
| 1,234,286 | Chambers | July 24, 1917 |